(12) United States Patent
Dehghan et al.

(10) Patent No.: US 11,010,905 B2
(45) Date of Patent: May 18, 2021

(54) EFFICIENT OBJECT DETECTION AND TRACKING

(71) Applicant: Apple Inc., Cupertino, CA (US)

(72) Inventors: Afshin Dehghan, Cupertino, CA (US); Yang Yang, Cupertino, CA (US); Feng Tang, Cupertino, CA (US); Kelsey Y. Ho, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 16/428,688

(22) Filed: May 31, 2019

(65) Prior Publication Data

US 2020/0082549 A1 Mar. 12, 2020

Related U.S. Application Data

(63) Continuation-in-part of application No. 16/125,625, filed on Sep. 7, 2018, now Pat. No. 10,846,515.

(51) Int. Cl.
*G06T 7/246* (2017.01)
*G06T 7/70* (2017.01)

(52) U.S. Cl.
CPC .............. *G06T 7/248* (2017.01); *G06T 7/70* (2017.01); *G06T 2207/10016* (2013.01); *G06T 2207/20081* (2013.01); *G06T 2207/20084* (2013.01)

(58) Field of Classification Search
CPC .......... G06T 7/248; G06T 2207/20081; G06T 7/70; G06T 2207/10016; G06T 2207/20084; G06T 7/246; G06K 9/00288
See application file for complete search history.

(56) References Cited

U.S. PATENT DOCUMENTS

| | | | |
|---|---|---|---|
| 9,542,585 B2 * | 1/2017 | Williams | G06K 7/10722 |
| 10,846,515 B2 * | 11/2020 | Dehghan | G06K 9/00295 |
| 2015/0294176 A1 * | 10/2015 | Kishi | G06K 9/3241 |
| | | | 348/169 |
| 2016/0219208 A1 | 7/2016 | Horesh | |
| 2016/0267325 A1 * | 9/2016 | Sundaresan | G06K 9/00624 |
| 2017/0053409 A1 | 2/2017 | Yamamoto et al. | |
| 2017/0083764 A1 | 3/2017 | Risinger et al. | |

* cited by examiner

*Primary Examiner* — Brandon J Miller
(74) *Attorney, Agent, or Firm* — BakerHostetler

(57) ABSTRACT

Techniques described herein provide efficient object detection and tracking in video images, such as may be used for real-time camera control in power-limited mobile image capture devices. The techniques include performing object detection on a first subset of frames of an input video, detecting an object and object location in a first detection frame of the first subset of frames, and tracking the detected object on a second subset of frames of the input video after the first detection frame.

18 Claims, 8 Drawing Sheets

100

200

300

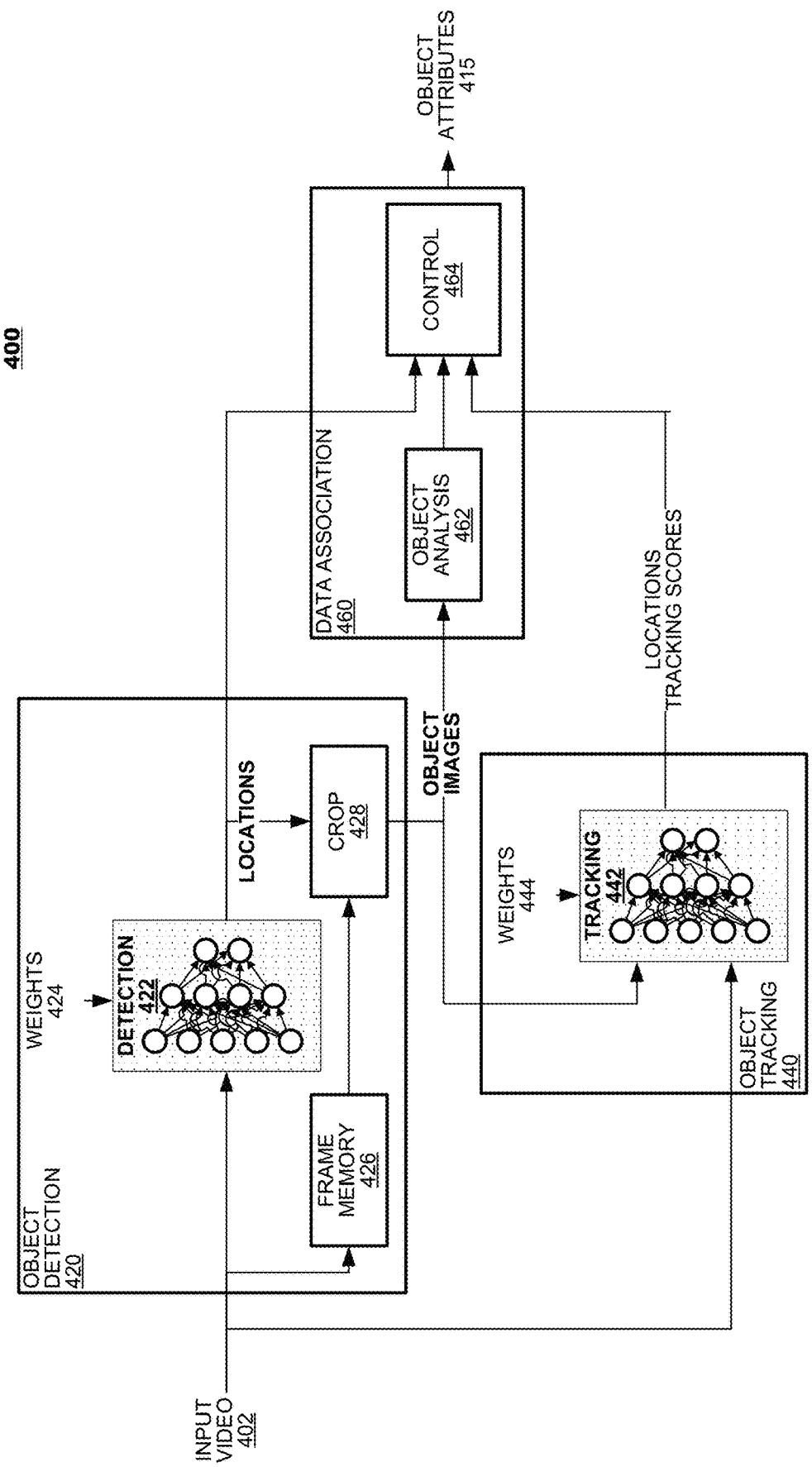

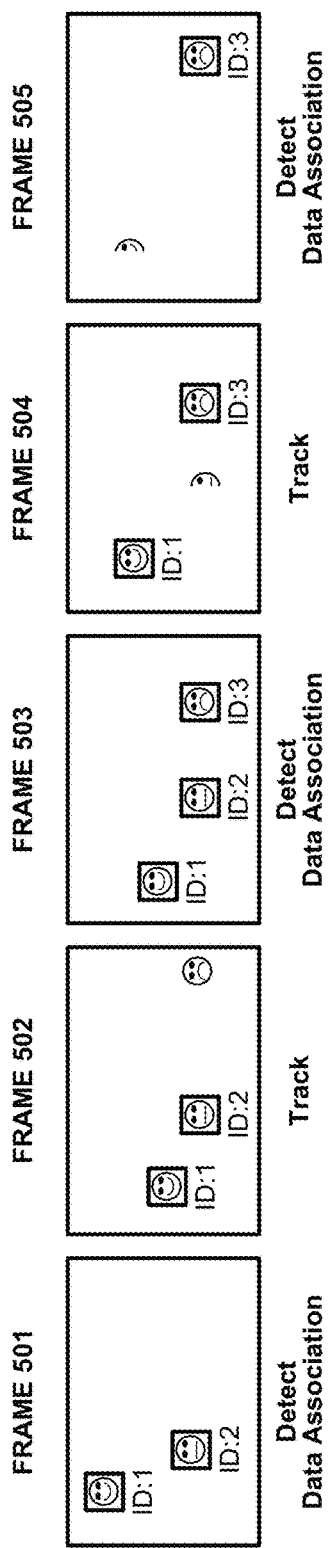

| Object ID | Detection Frame 1 | Tracking Frames | Detection Frame 2 | Tracking Frames | Detection Frame 3 | Tracking Frames | Detection Frame 4 | Tracking Frames | Detection Frame 5 | Tracking Frames |
|---|---|---|---|---|---|---|---|---|---|---|
| 1 | ☺ | ☺ | ☺ | ☺ | ☺ | ☺ | ☺ | ☺ | ☺ | ☺ |
| 2 | ☺ | ☺ | ✗ | ☺ | ✗ | ☺ | ☺ | ☺ | ✗ | ☺ |
| 3 | ☺ | ☺ | ✗ | ☺ | ✗ | ☺ | ✗ Terminate | | | |
| 4 | ☺ | ☺ | ☺ | ✗ Terminate | | | | | | |

FIG. 6

| Object ID | Detection Frame 1 | Tracking Frame 1.1 | Tracking Frame 1.2 | Tracking Frame 1.3 | Detection Frame 2 | Tracking Frame 2.1 | Tracking Frame 2.2 | Tracking Frame 2.3 |
|---|---|---|---|---|---|---|---|---|
| 4 | ☺ | ☺ | ☺ | ☺ | ☺ | ☺ | ✗ Terminate | |

EFFICIENT OBJECT DETECTION AND TRACKING

CLAIM FOR PRIORITY

This application claims the benefit of priority afforded to, and is a continuation-in-part of, U.S. patent application Ser. No. 16/125,625, filed Sep. 7, 2018, the disclosure of which is incorporated herein by reference in its entirety.

BACKGROUND

The present disclosure relates to techniques for video image analysis.

Cameras have become virtually ubiquitous on mobile electronics devices such as cell phones. Images and video captured by a camera can be generally improved by understanding the contents of a scene being captured by the camera. For example, detection of an object such as a face may allow for control of a camera parameters, such as focus distance and white balance, based on location, movement, and lighting conditions of the detected object. However, reliable object detection techniques are often a compute intensive, power-hungry, and offline processes.

BRIEF DESCRIPTION OF THE DRAWINGS

FIG. 4 depicts an image analysis system according to an aspect of the present disclosure.

FIG. 5 depicts an aspect of the present disclosure as applied to an example video sequence of images with moving face objects.

FIG. 6 depicts an example dataset for tracking termination.

FIG. 7 depicts an example dataset for tracking termination.

DETAILED DESCRIPTION

Techniques described herein provide efficient and accurate object detection in video images, such as may be used for real-time camera control in power-limited mobile image capture devices. The techniques include performing object detection on a first subset of frames of an input video, detecting an object and object location in a first detection frame of the first subset of frames, and tracking the detected object on a second subset of frames of the input video after the first detection frame, wherein the second subset and the first subset are non-overlapping. In an aspect, the input video may be divided such that a first subset frame occurs every Nth frame, N being a predetermined number, and the remaining fames are second subset frames. In another aspect, track may be ended when either the object is not detected for a predetermined number of consecutive first subset frames after the first detection frame or a tracking score for the object falls below a tracking threshold. Object detection may include determining a location and other attributes of detected objects, while tracking may include determining changes in the location or the other attributes of previously detected objects.

Figure 1:
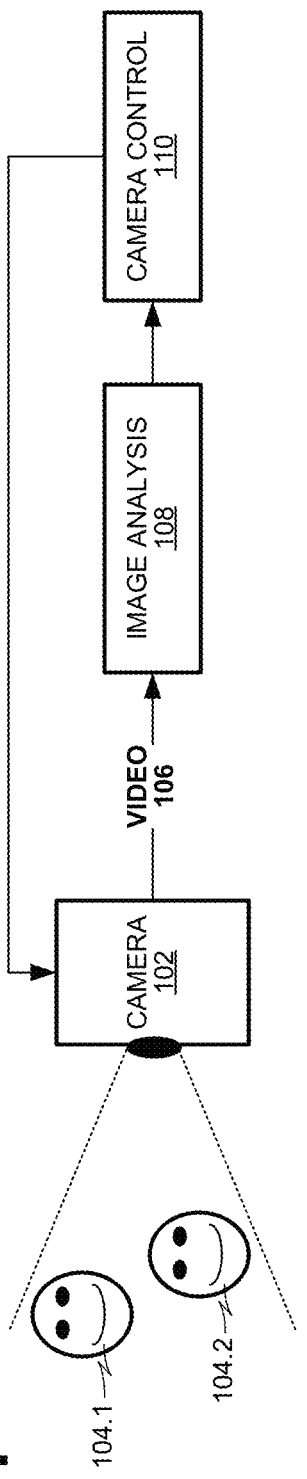
FIG. 1 depicts a system according to an aspect of the present disclosure.

FIG. 1 depicts a system 100 in which aspects of the present disclosure find application. The system 100 may include a camera 102, an image analysis unit 108, and a camera controller 110. The camera 102 may capture video images 106 of a scene which may contain objects 104.1 and 104.2 such as faces. The camera 102 may provide the captured images as video 106 data stream to the image analysis unit 108, which may analyze images in the video 106, and detect predetermined object(s) from within its content. The camera controller 110 may respond to data output from of the image analysis unit 108 to control the camera 102. In an aspect of the present disclosure, the image analysis unit 108 may detect objects 104.1, 104.2 from within captured video 106, and identify location(s) of the detected objects. In an aspect, the image analysis unit 108 may assign attributes to object data. For example, in an aspect where the detected objects are human facts, the attribute data may identify motion characteristics of the facts, lighting of the faces, pose or angle of the faces relative to the camera, eye location, and an indication the face's state (e.g., whether eyes on the face are closed or blinking, whether the face is smiling, etc.). The camera controller 110 may use image analysis results, such as object attributes, to control camera capture parameters, such focus distance or capture times for other images.

Figure 2:
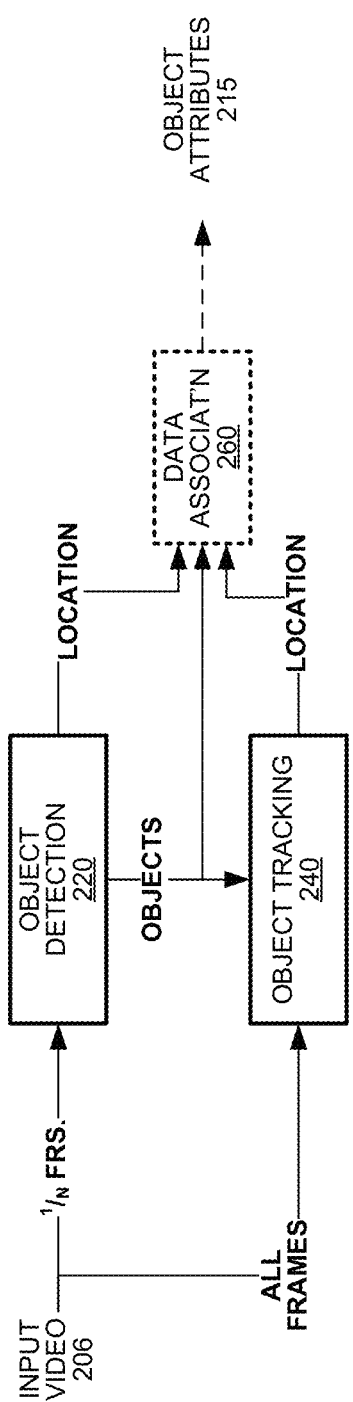
FIG. 2 depicts an image analysis system according to an aspect of the present disclosure.

FIG. 2 depicts an image analysis system 200 according to an aspect of the present disclosure. The image analysis system 200 may find application as the image analysis unit 108 of FIG. 1. The image analysis system 200 may include an object detection unit 220, and an object tracking unit 240. In an aspect, the object detection unit 220 may process a subset of frames (called, "detection frames," for convenience) of input video 206 and identify predetermined types of objects (e.g., human faces, human bodies, etc.) from within their content. The object tracking unit 240 may respond to data from the object detection unit 220 indicating detection of the object(s) and may track the detected objects in other frames of the input video 206. The object tracking unit 240 may output data identifying location(s) of the tracked objects within the input video.

Processes performed by the image analysis system 200 may to conserve processing resources and reduce latency as compared to known techniques for image processing. Object detection 220 may require more processing resources including electric power as well as longer latency as compared to object tracking 240. Hence, by operating the object detection unit 220 only intermittently on a subset of frames from the input video 206, the processing resources and latency required are reduced as compared to an alternative design that detects objects from all frames of an input video. Operations performed by the object tracking unit 240 are expected to have lower complexity and lower latency as compared to object detection unit 220 and, thus, the image analysis system 200 may provide location data for all frames of an input video sequence 206 without incurring processing costs that would be required to detect objects in all such frames. For example, object tracking unit 240 may require only 10% of the resources and 10% of the latency to process a frame as compared to object detection unit 220. By operating such an example detection unit only intermittently, power consumption and latency may be reduced by 65%, for example.

Improved temporal stability of detected objects may be an additional benefit from the combined used of detection and tracking techniques. By combining tracking and detection techniques, a determination for the existence of an object in any particular frame may be more reliable than, for example, running only object detection unit 220 on every frame to determine which objects exist in each frame may be less reliable than a combination of detection and tracking. If the determination of which objects exist were presented visually, temporal object instability may cause flickering where objects are determined to exist, not exist, and exist again in rapid succession, for example due to the limitations of performing object detection only without object tracking.

In an aspect, a predetermined subset of 1/N frames are used by object detection unit, where N is a predetermined integer constant. For example, object detection unit 220 may process a fixed cadence of input video frames, such as one out of every three sequential frames (when N=3). Object detection unit 220 may identify objects and their locations, and may distinguish between objects, for example by assigning unique identifier to each object detected within image content. The identifier can be used to determine if an object detected in one detection frame is the same object as an object detected in a different detection frame. Hence, an object ID may be used to determine if a face detected in one frame is the same as a face detected in another frame. Object tracking unit 240 may track the objects previously detected by the object detection unit 220. As depicted in FIG. 2, object tracking may operate on any frames of input video 206. Object tracking unit 240 may receive an indication of the objects identified in a detection frame from object detection unit 220, and then track changes to those objects in subsequent frames.

In other aspects of this disclosure, the system 200 may also find application in other contexts, such as to facilitate automated image or video editing applications. The principles of the present disclosure find application in motion picture data of natural image sources (e.g., image data captured by a camera or other image sensor). They also find application with synthetically-generated video, for example, graphics data generated by computer applications, computer animation systems, or video editors.

In an aspect, the object detection 220 and object tracking 240 may identify a location for each object in a frame. In an alternate aspect, detection and tracking may identify only the existence and identity (and ID or signature) of objects in a frame.

In an aspect, the image analysis system 200 may include a data association unit 260 that assigned identifiers to detected objects over periods longer than the period between detection frames. Data association unit 260 may respond to location data output by the object tracking unit 240 and/or the object detection unit 220 and assign identifiers based on correlations between the locations. Alternatively, the data association unit 260 may assign identifiers to location data output from the object tracking unit based on location data and tracking scores assigned to the location data (described herein).

In another aspect, data association unit 260 may also determine additional attributes of objects not provided by detection unity 220 or tracking unity 240, for example by analysis of object images. For example, data association unit 260 may identify attributes such as lighting, face pose, etc., of the objects located by object detection unit 220 on detection frames. Optional data association unit 260 may associate attributes of objects determined on a detection frame with the tracked objects on non-detection frames. Data association unit 260 may thus provide object attributes 215 on both detection frames and non-detection frames.

In an aspect, object tracking unit 240 may track changes to detected objects only on non-detection frames. In another aspect, object tracking unit 240 may also track objects on detection frames.

Figure 3:
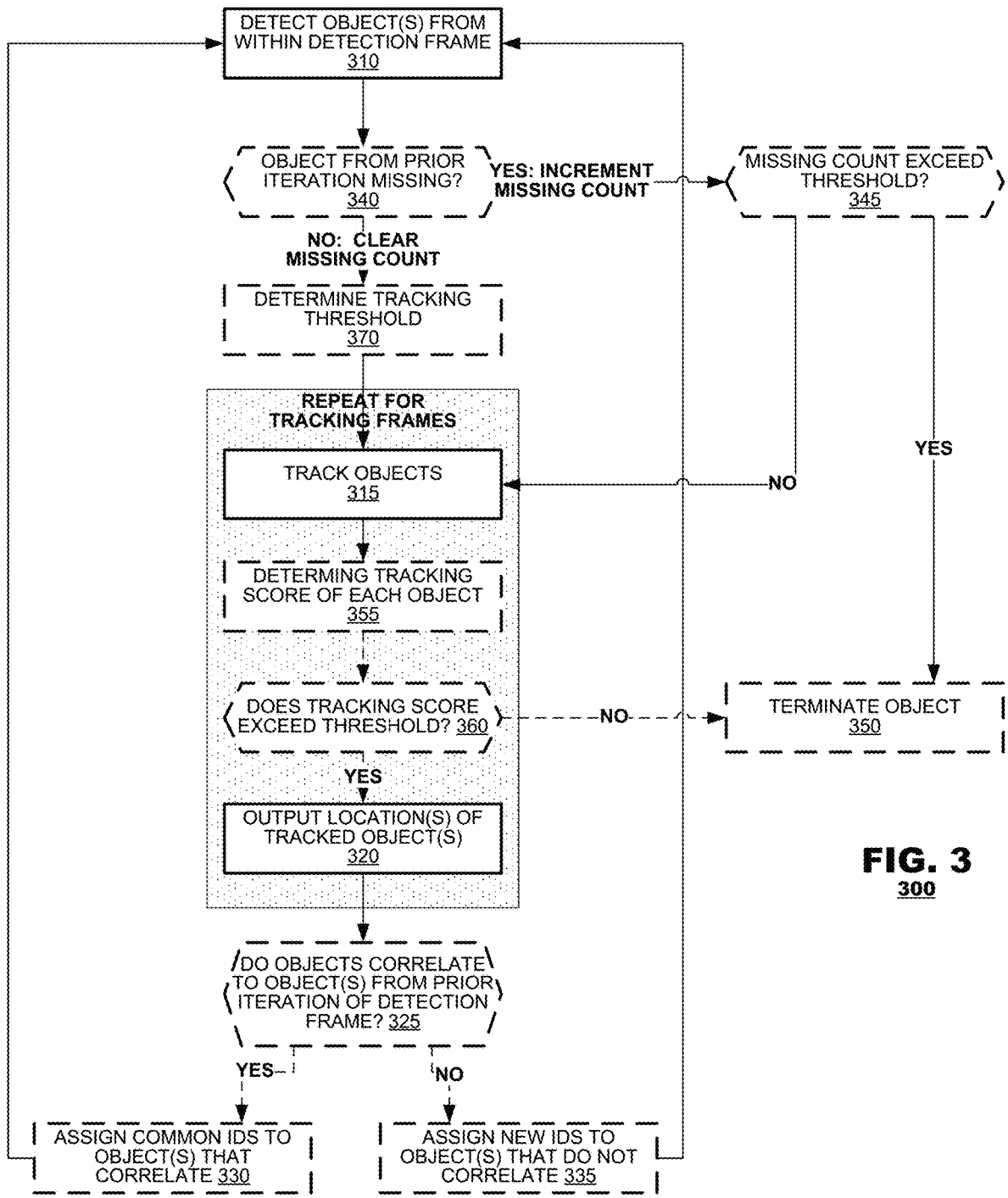
FIG. 3 depicts a method according to an aspect of the present disclosure.

FIG. 3 depicts a method 300 according to an aspect of the present disclosure. The method 300 may identify object(s) from within captured video data and output data identifying their spatial location(s) in the data. The method 300 may start by detecting objects on a first frame, designated as a detection frame (box 310). Detected objects may be tracked (box 315) for one or more frames that follows the detection frame using identifications of the objects in the detection frame as location references. When the objects' locations are identified in the tracking frames, the method 300 may output location data (box 320) representing the objects' location(s) within each tracking frame. As discussed, the detection frames may be some predetermined subset of the overall number of frames in the input video sequence. Thus, if the detection frames are selected to be $1/N^{th}$ of the input video sequence, the boxes 315 and 320 may be performed N−1 times each time a detection frame is processed in box 310. For example, detection may be performed on one out of every five frames, while tracking is performed on the remaining four out of five frames.

In an aspect, the method 300 may compare data of objects detected in a present iteration of boxes 310-320 and object(s) detected in a prior iteration of the boxes 310-320 and determine if there is correlation between the objects detected and tracked in the two iterations (box 325). If correlation is detected between objects in the two iterations, then the method 300 may assign a common ID to the object in the new iteration (box 330). If no correlation is detected for a detected/tracked object in the present iteration, that object may be assigned a new ID (box 335).

In another aspect, an object may be terminated based on detection results on detection frames. Results of object detection (box 310) from consecutive iterations may be compared to each other to determine when objects from a prior iteration no longer are detected (box 340). If so, the method 300 may increment a count variable for the object (shown as a "missing count" value in FIG. 3), and the method 300 may determine whether the missing count value for that object exceeds a predetermined detection threshold (box 345). If the missing count value exceeds the predetermined detection threshold, then the method 300 may indicate that tracking for the object is terminated (box 350). This predetermined threshold for an object missing for consecutive detection frames is called "M" herein. Termination of tracking for a given object may include generating output data indicating that an ID that formerly was assigned to the object instance is de-allocated.

In another aspect, an object may be terminated based on tracking results on tracking fames. A tracking score may be determined for each object tracked (box 355). If the tracking score does not exceed a tracking threshold (box 360), that object may be terminated (box 350). In some aspects, the tracking threshold may be predetermined for all objects. In other aspects, tracking score threshold may vary per object. In some aspects (not depicted), tracking may not be terminated for an object until the tracking score for the object does not exceed the tracking threshold for the object for a predetermined number of consecutive frames. For objects detected in box 310, a tracking threshold may be determined (box 370), for example, based on attributes of the object, attributes of the background of the object, and/or lighting of the scene captured in the image containing the object.

In some situations, a global threshold for multiple objects won't work for terminating tracking due to variations in object attributes and variations in scene characteristics. Additionally, the tracking threshold may vary over time as object attributes and scene characteristics vary over time, and a new tracking threshold may be determined again on every detection frame even for objects that persist between detection frames.

FIG. 4 depicts an image analysis system 400 according to an aspect of the present disclosure. In an aspect, system 400 may provide example additional details of the image analysis system 200 of FIG. 2. System 400 includes input video 402, object detection unit 420, object tracking unit 440, data association unit 460, and object attributes 415. Object detection unit 420 includes a detection neural network 422, detection weights 424 for controlling and training the detection neural network 422, a frame memory 426, and image cropping unit 428. Object tracking unit 440 includes a tracking neural network 442 and tracking weights 444 for controlling and training of the tracking neural network 442. Data association unit 460 includes object analysis unit 462 and a control unit 464.

A detection neural network 422 may be run on a subset of frames of input video 402. These detection frames may be stored in a frame memory buffer 426, and detection unit 422 may detect the location of objects, such as faces, in the detection frames. A location of a detected object may be indicated, for example, by a bounding box within the frame of video, or by an indication of the shape of an object and the location of the shape within the frame of video. Cropping unit 428 may crop the detection frame stored the frame memory 426 based on the locations of objects determined by detection neural network 422. Cropped object images may be provided to object tracking unit 440 and tracking neural network 442 and object analysis unit 462. Tracking neural network 442 may track changes in a detected object's location based on a current frame and the object image from a previous detection frame to determine a new location and a tracking score.

Object analysis unit 462 may determine attributes of an object other than location on detection frame, for example by analyzing object images provided by cropping unit 428. Object attributes determined by the object analysis unit 462 may include, for example: lighting of the faces, pose or angle of the faces relative to the camera, eye location, and in indication of if eyes on the face are closed or blinking. The control unit 464 may integrate data across frames. The control unit 464 may determine if object detected by object detection unit 420 in a first detection frame are the same objects that are detected in another detection frame. The control unit 464 may also associate object attributes determined by object analysis unit 462 on detection frames with objects tracked by object tracking unit 440 on non-detection frames. Object attributes 415 may be provided for objects in all frames, whether detection frames or non-detection frames.

In an aspect, the control unit 464 may use results from object tracking unit for objects in detection frames that are not detected but are tracked. If control unit 464 determines that an object has not been detected for a predetermined number M of consecutive detection frames (for example, not detected for M*N consecutive frames of input video 402, where N is the periodicity of input video frames that are detection frames), control unit 464 may determine that an object has disappeared and to terminate tracking of that object. Similarly, if control unit 464 determines that a tracking score falls below predetermined tracking score threshold, the control unit 464 may determine that an object has disappeared and to terminate tracking of that object. Termination of tracking or disappearance of an object may be communicated to the consumer of object attributes 415.

In an aspect, the detection weight 424 and/or tracking weights 444 may be pre-trained prior to starting analysis of input video 402. In another aspect, detection weight 424 and/or tracking weights 444 may instead or additionally be trained during processing of input video 402.

FIG. 5 depicts an aspect of the present disclosure as applied to an example video sequence 500 of images with moving face objects. Video sequence 500 includes frames 501-505 containing face objects. In this example application of system 200 of FIG. 2 to the video sequence 500, every other frame may be a detection frame (N=2). Hence, object detection unit 220 may operate on frames 501, 503, and 505, while object tracking unit 240 may operate on frames in between detection frames, including frames 502 and 504. Video sequence 500 starts with two face objects in frame 501, which may be detected detection unit 220, and optional data association unit may associate an ID with each detected face. In FIG. 5, detection is indicated by the box surrounding the face, and associated ID number is indicated under each detected face image. The tracking unit may operate on the next frame, 502, as it is not a member of the detection subset of frames. Faces with IDs 1 and 2 may be successfully tracked in frames 502. A third face, the frowning face, appears in frame 502, but since it was not detected in a previous detection frame, it is not tracked in frame 502. In the second detection frame 503, all three faces are detected, and IDs are associated with each. In tracking frame 504, face object with ID 2 has become partially obscured, and hence may not be tracked even though a portion of the object is present in frame 504. For the third detection frame 505, only the face with ID 3 is detected. The face with ID 2 has disappeared, while the face with ID 1 may still be partially present but has changed sufficiently to not be detected. Objects may fail to be detected on detection frames and may fail to be tracked on tracking frames when the objects, for example, disappear from a frame, become partially obscured as they enter or exit the frame, become partially obscured by other objects in the frame, or the object may still be fully visible in the frame but change visually in some way.

FIGS. 6 and 7 and depict an example dataset for tracking termination. In FIG. 6, four objects (IDs=1, 2, 3, 4) are tracked over a series of frames. In this example, the number of tracking frames between detection frames is N=3, and tracking is stopped when an object is missing for M=3 consecutive detection frames after first being detected. The series of frames include detection frames 1 to 5 interleaved with three tracking frames between neighboring detection frames. Successfully detection or tracking is indicated by a check mark, while failed detection or tracking is indicated by an X. For example, all four objects (IDs 1-4) are detected on detection frame 1, and objects with IDs 2 and 3 are not detected on detection frame 2.

In the case of object ID 1, it is detected and tracked on all frames depicted, and hence tracking of object one is never terminated. Tracking of object 3 is terminated on detection frame 4 because detection frame 4 is the M=$3^{rd}$ detection frame in a row for which object ID 3 was not detected. In contrast to object ID 3, object ID 2 tracking is not terminated. Object ID 2 is not detected in detection frames 2, 3, and 5 after being detected in detection frame 1, but detection frames 3 and 5 are not consecutive so tracking is not terminated at detection frame 5.

Object 4 tracking is terminated when tracking fails. Tracking may fail for example as an object becomes obscured or leaves the image frame. As further shown in FIG. 7, object ID 4 tracking fails in tracking frame 2.2, which may be between detection frames 2 and 3.

The foregoing discussion has described operation of the aspects of the present disclosure in the context digital image analysis. Commonly, these components are provided as electronic devices. Digital image analyzers or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones, or computer servers, and they also can be packaged in consumer software applications such as video games, media players, media editors, and the like. Such computer programs typically are stored in physical storage media such as electronic-, magnetic- and/or optically-based storage devices, where they are read by a processor and executed. And, of course, these components may be provided as hybrid systems that distribute functionality across dedicated hardware components and programmed general-purpose processors, as desired.

Tracking Improvements

Additional tracking techniques may include dual tracking scores with corresponding thresholds, re-identification of objects when tracking is initially lost, training a tracking neural network with inference selected data. These additional tracking techniques may be used independently or in combination with the techniques described above, for example, with respect to FIGS. 1-7.

The additional tracking techniques may include detecting an object within a first frame and determining a tracking threshold and an initial location map for the object based on the detecting. The object may be tracked in a second frame subsequent to the first frame, and a tracking score and a tracking location map for the second frame may be determined based on the tracking of the second frame. Tracking success may be measured with both the tracking score and a similarity score determined based on the similarity between the tracking location map and the initial location map. When the similarity score is below a similarity threshold and the tracking score is below the tracking threshold, tracking may have failed, and the object may be processed as lost in the second frame. Otherwise tracking may have succeeded, and an indication of the location of the object may be output for the second frame.

These additional tracking techniques may reduce drift of tracked objects, where the accuracy of the tracked object location deteriorates over time. In addition, these techniques may improve the accuracy of tracking deformable objects, objects that change aspect ratio, objects that are temporarily obscured or temporarily exit a camera frame or field-of-view, and objects that rotate to obscure the side originally in view when the objects were detected on a detection frame.

Figure 8:
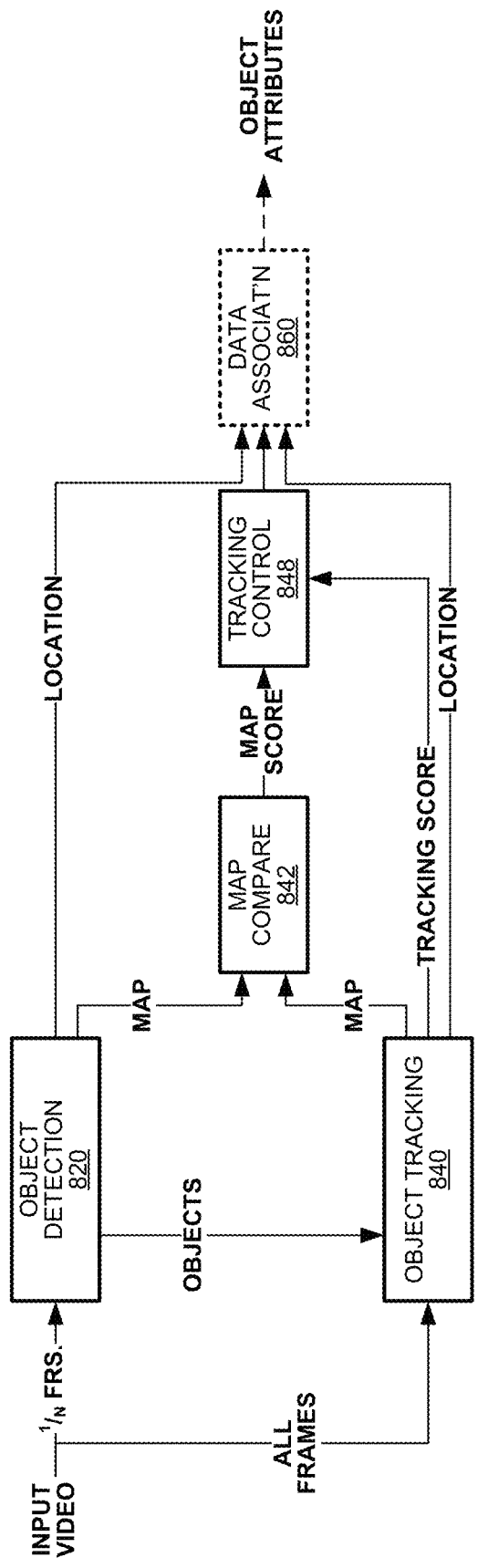
FIG. 8 depicts an image analysis system according to an aspect of the present disclosure.

FIG. 8 depicts an image analysis system 800 according to an aspect of the present disclosure. The image analysis system 800 may find application as the image analysis unit 108 of FIG. 1. The image analysis system 800 may include an object detection unit 820, and an object tracking unit 840. In an aspect, the object detection unit 220 may process a subset of frames (called, "detection frames," for convenience) of input video and identify objects (e.g., human faces, human bodies, dogs, cats, etc.) and their locations from within the frame's content. The object tracking unit 840 may respond to data from the object detection unit 820 indicating detection of the object(s) and may track the detected objects in other frames of the input video. The object tracking unit 840 may output data identifying location(s) of the tracked objects within the input video along with a tracking confidence score. Object detection 820 and may produce a location map including location measures for the detected object(s) in various regions within the detected frame, and object tracking 840 may produce a location map including location measures for the tracked objected in the various regions within a tracked frame. Map compare 842 may compare the location map for a current tracked frame with the location map for the prior detection frame to produce a map score. Tracking control 848 may control the tracking process and determine if an object has been successfully tracked based on the tracking score and the map comparison score. Optional data association unit 860 may associate data with detected and tracked objects, and output object attributes.

Object detection unit 820 and object tracking unit 840 may operate as explained above with respect to FIG. 4, and may include a detection neural network and a tracking neural network, respectively. In some aspects, a direct output of the detection neural network and the tracking neural network may include a location map. A location map may be a "heat map" of an object location, where each entry in the map corresponds to a frame region, such as a pixel or group of pixels, and each entry indicates the likelihood that a portion of the object is contained within that entry's corresponding region. Map compare 842 may then compare the similarity of these location heat maps, for example by calculating a Kullback-Leibler (KL) divergence score. Tracking control 848 may determine if tracking was successful using the dual scores of the map score and the tracking confidence score. For example, if both the map score and the tracking score are below respective thresholds, tracking may be determined to have failed, while tracking may be determined to be successful otherwise.

An object location may be identified by a bounding box that substantially encompasses the detected or tracked object. Object detection unit 820 and object tracking unit 840 output a bounding box as the location of the detected or tracked object. A bounding box for an object may be determined, for example, from a location map of the object. Object tracking unit 840 may track a detected object within or near the region of the a bounding box identified for the object in a previously detected or tracked frame. In an aspect, an initially identified bounding box may be grown to include portions of the image surrounding the detected or tracked object. Such an enlarged bounding box may include portions of a physical object that were not detected by object detection unity 820. For example, if an object detection unit is designed to detect human faces, an initial bounding box may include only the face of a person in an image. An enlarged bounding box may be grown from an initial bounding box based on image analysis, for example to identify bounds of the larger object, or may be grown by simply increasing the dimensions of the initial bounding box by a fixed percentage. After growing the bounding box, the enlarged bounding box may additionally include portions of the persons head or body that was not included in the original bounding box. Such an enlarged bounding box may improve the likelihood of tracking the face through frames with partial or even total occlusion of the detected face because additional portions of head or body attached to the face will also be tracked.

In an aspect, an object tracker, such as the object trackers of boxes 840 may be improved with training. For example, an object tracker includes a neural network, the neural network may be trained at certain checkpoint frames, such as every detection frame. Training may include training the neural network on a selection of data from a large training data set. The training data selection may be mined from the large training data set based on inferences from previous trainings. Based on these inferences, a previous training data set may be modified by adding new data from the large data set, and by discarding redundant data.

In an aspect, optional data association unit 860 may, for each frame, associate an object location with a persistent object identifier (object ID), where the object ID may remain constant over all detection and tracking frames. Optional data association unit 860 may also indicate that, for a particular frame an object was not present (was not detected or tracked in that frame).

Figure 9:
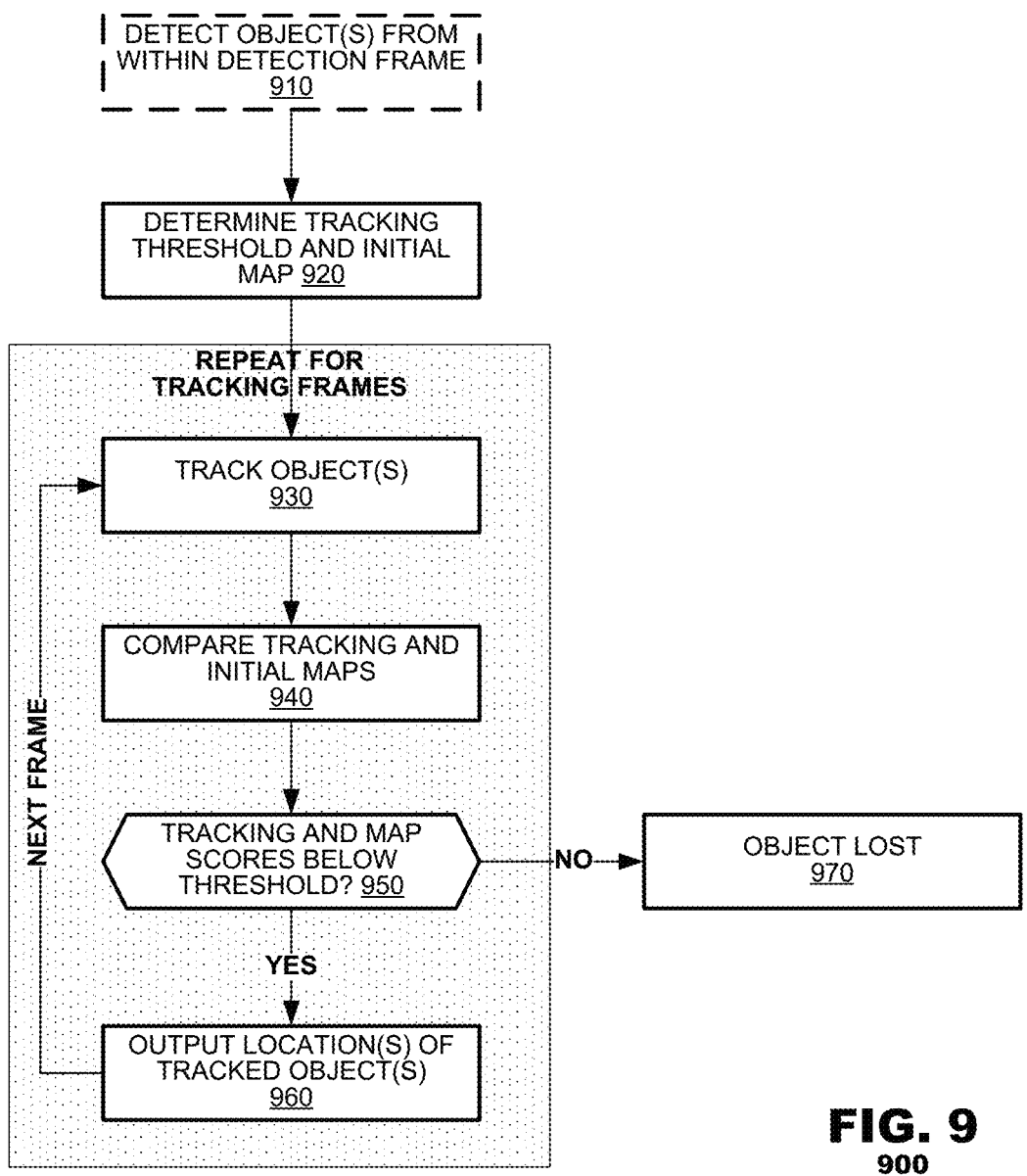
FIG. 9 depicts a method according to an aspect of the present disclosure.

FIG. 9 depicts a method 900 according to an aspect of the present disclosure. In method 900, a tracking threshold and an initial location map may be determined (box 920) after optionally detecting object(s) within a detection frame (box 910). Object(s) are tracked (box 930) and a tracking score and a tracking location map determined for a tracking frame. The tracking location map maybe compared to the initial location map (box 940) to determine a location map similarity score. If both the map similarity score and the tracking score are below a threshold, the object may be lost (box 970) for the tracking frame. Otherwise, the tracking may be considered successful for the tracking frame and the location(s) of the tracked object(s) may be output (box 960), and repeating the tracking process from box 930 for the next frame.

Figure 10:
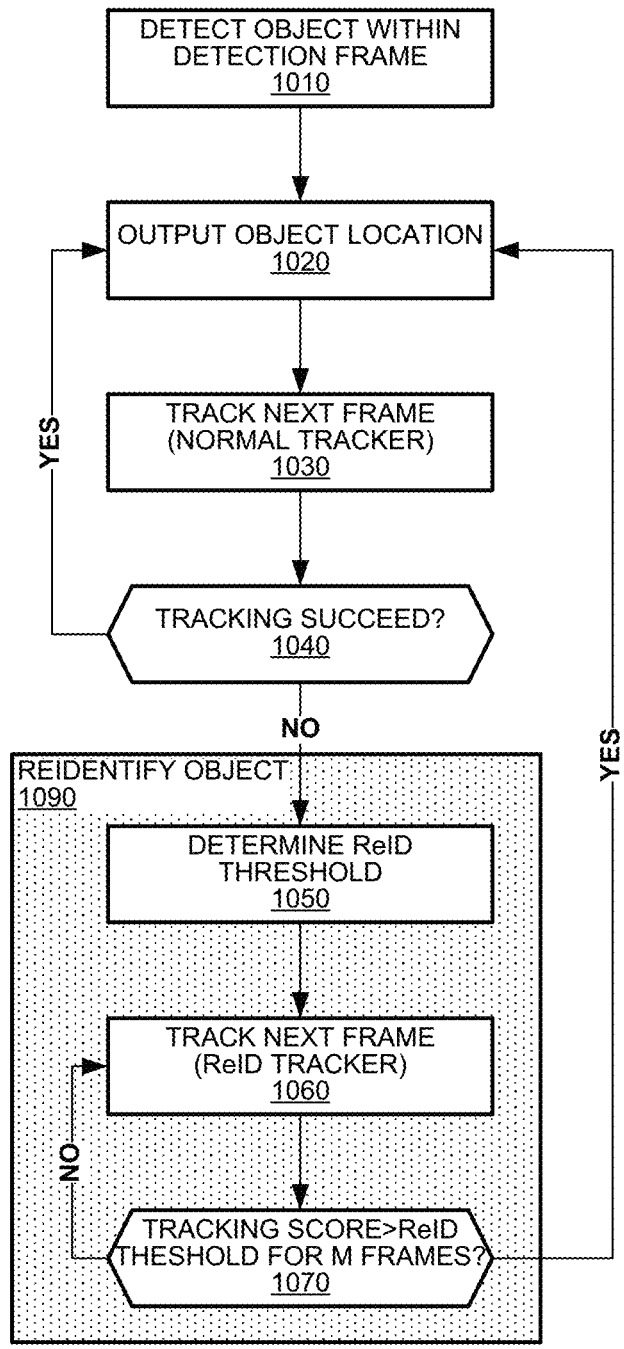
FIG. 10 depicts a method according to an aspect of the present disclosure.

FIG. 10 depicts a method 1010 according to an aspect of the present disclosure. Method 1010 may reidentify an object lost due to a tracking failure. In method 1010, an object and its location may be detected within a detection frame (box 1010), and the object location may be output (box 1020). The object may then be tracked in a subsequent frame (box 1030). If tracking succeeds (box 1040), the tracked object location is output (box 1020), and tracking continues normally for subsequent frames. However, if tracking fails (box 1040), for example as in the "object lost" box 970 of FIG. 9, then the object may be reidentified (box 1090) in subsequent tracking frames (before the next detection frame). A reidentification threshold may be determined (box 1050). A reidentification tracker may track the next frame (box 1060), which may determine a reidentification score. If the reidentification score is above the reidentification threshold for a predetermined number of M frames (box 1070), then normal object tracking resumes in box 1020.

In an aspect, the reidentification threshold may be determined based on the successful tracking of multiple previous frames. For example, the reidentification threshold for an object may be based on the tracking score for all previous frames since the last detection frame in which the object was successfully tracked. In another aspect, the reidentification tracker of box 1060 may operate by enlarging the search area around the location of a recent location of the object, and running the normal tracker of box 1030 using the enlarged search area. In a further aspect, tracking success (box 1040), may be determined as described above regarding boxes 940 and 950 of FIG. 9. In another aspect, the predetermined number M of frames (box 1070) may or may not be consecutive frames, and the number M may be 1 or greater.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. An object tracking method, comprising:
   detecting an object within a first frame;
   determining a tracking threshold and an initial location map for the object based on the detecting;
   tracking the object a second frame subsequent to the first frame;
   determining a tracking score and a tracking location map for the second frame based on the tracking of the second frame;
   determining a similarity score between the tracking location map and the initial location map; and
   when the similarity score is below a similarity threshold and the tracking score is below the tracking threshold, processing the object as lost in the second frame, and otherwise outputting an indication of the location of the object for the second frame.

2. The method of claim 1, wherein the processing the object as lost includes:
   determining a reidentification threshold;
   tracking the object in frames subsequent to the second frame with an expanded search area around a previous location of the object;
   determining a reidentification score for frames subsequent to the second frame;
   when, on a third frame, the reidentification score is above the reidentification threshold for a predetermined number of consecutive frames subsequent to the second frame, outputting an indication of the location of the object for the third frame and resuming object tracking without an expanded search area.

3. The method of claim 2, wherein the reidentification threshold is based on the tracking scores for the second frame and for frames between the first and second frames.

4. The method of claim 1, wherein the similarity score is determined by calculating a Kullback-Leibler (KL) divergence score between the tracking location map and the initial location map.

5. The method of claim 1, further comprising:
   identifying an initial bounding box for the object based on the detecting; and
   growing the initial bounding box into an enlarged bounding box for the object by including regions outside and neighboring the initial bounding box;
   wherein the tracking tracks the object near the enlarged bounding box.

6. The method of claim 1, wherein the tracking includes use of a neural network tracker, and further comprising:
   selecting training data by mining training samples from training data set;
   training the neural network tracker with the training data;
   inferring training data improvements based on the training;
   selecting improved training data based on the inferred improvements.

7. An object tracking system, comprising:
   a detection unit for detecting an object within a first frame and determining a tracking threshold and an initial location map for the object based on the detecting;
   a tracking unit for tracking the object a second frame subsequent to the first frame and determining a tracking score and a tracking location map for the second frame based on the tracking of the second frame;

a tracking control unit for determining a similarity score between the tracking location map and the initial location map, when the similarity score is below a similarity threshold and the tracking score is below the tracking threshold, processing the object as lost in the second frame, and otherwise outputting an indication of the location of the object for the second frame.

8. The system of claim 7, wherein the control unit processes the object as lost by:
    determining a reidentification threshold;
    tracking the object in frames subsequent to the second frame with an expanded search area around a previous location of the object;
    determining a reidentification score for frames subsequent to the second frame;
    when, on a third frame, the reidentification score is above the reidentification threshold for a predetermined number of consecutive frames subsequent to the second frame, outputting an indication of the location of the object for the third frame and resuming object tracking without an expanded search area.

9. The system of claim 8, wherein the reidentification threshold is based on the tracking scores for the second frame and for frames between the first and second frames.

10. The system of claim 7, wherein the similarity score is determined by calculating a Kullback-Leibler (KL) divergence score between the tracking location map and the initial location map.

11. The system of claim 7, wherein:
    the detection unit further identifies an initial bounding box for the object based on the detecting, and grows the initial bounding box into an enlarged bounding box for the object by including regions outside and neighboring the initial bounding box;
    the tracking unit tracks the object near the enlarged bounding box.

12. The system of claim 7, wherein the tracking unit includes a neural network tracker, and the tracking unit further:
    selects training data by mining training samples from training data set;
    trains the neural network tracker with the training data;
    infers training data improvements based on the training;
    selects improved training data based on the inferred improvements.

13. A non-transitory computer readable medium comprising instructions that, when executed by a processor, cause:
    detecting an object within a first frame;
    determining a tracking threshold and an initial location map for the object based on the detecting;
    tracking the object a second frame subsequent to the first frame;
    determining a tracking score and a tracking location map for the second frame based on the tracking of the second frame;
    determining a similarity score between the tracking location map and the initial location map;
    when the similarity score is below a similarity threshold and the tracking score is below the tracking threshold, processing the object as lost in the second frame, and otherwise outputting an indication of the location of the object for the second frame.

14. The medium of claim 13, wherein the instructions for the processing the object as lost cause:
    determining a reidentification threshold;
    tracking the object in frames subsequent to the second frame with an expanded search area around a previous location of the object;
    determining a reidentification score for frames subsequent to the second frame;
    when, on a third frame, the reidentification score is above the reidentification threshold for a predetermined number of consecutive frames subsequent to the second frame, outputting an indication of the location of the object for the third frame and resuming object tracking without an expanded search area.

15. The medium of claim 14, wherein the reidentification threshold is based on the tracking scores for the second frame and for frames between the first and second frames.

16. The medium of claim 13, wherein the similarity score is determined by calculating a Kullback-Leibler (KL) divergence score between the tracking location map and the initial location map.

17. The medium of claim 13, wherein the instructions further cause:
    identifying an initial bounding box for the object based on the detecting; and
    growing the initial bounding box into an enlarged bounding box for the object by including regions outside and neighboring the initial bounding box;
    wherein the tracking tracks the object near the enlarged bounding box.

18. The medium of claim 13, wherein the tracking includes use of a neural network tracker, and the instructions further cause:
    selecting training data by mining training samples from training data set;
    training the neural network tracker with the training data;
    inferring training data improvements based on the training;
    selecting improved training data based on the inferred improvements.

* * * * *